Patented Jan. 2, 1945

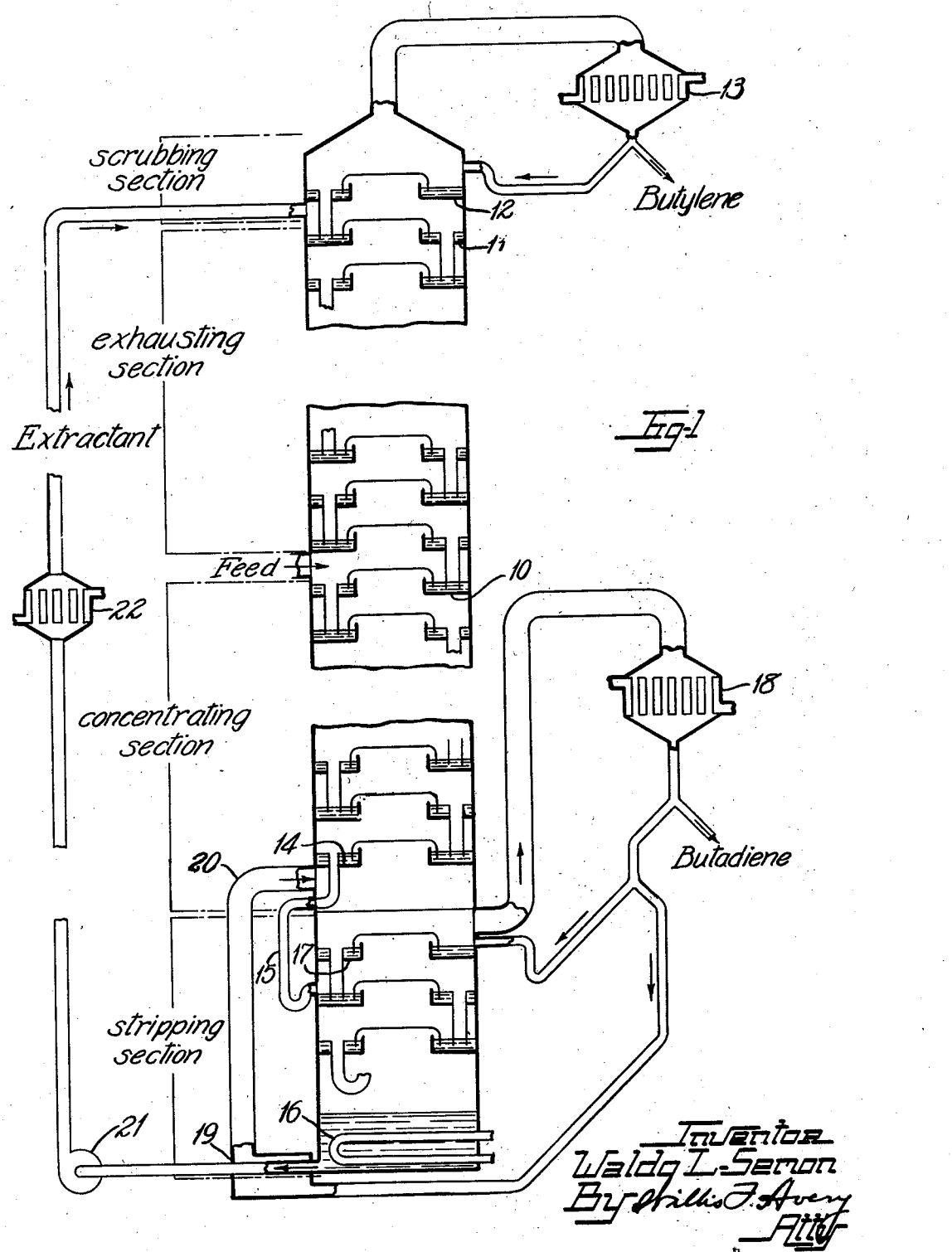

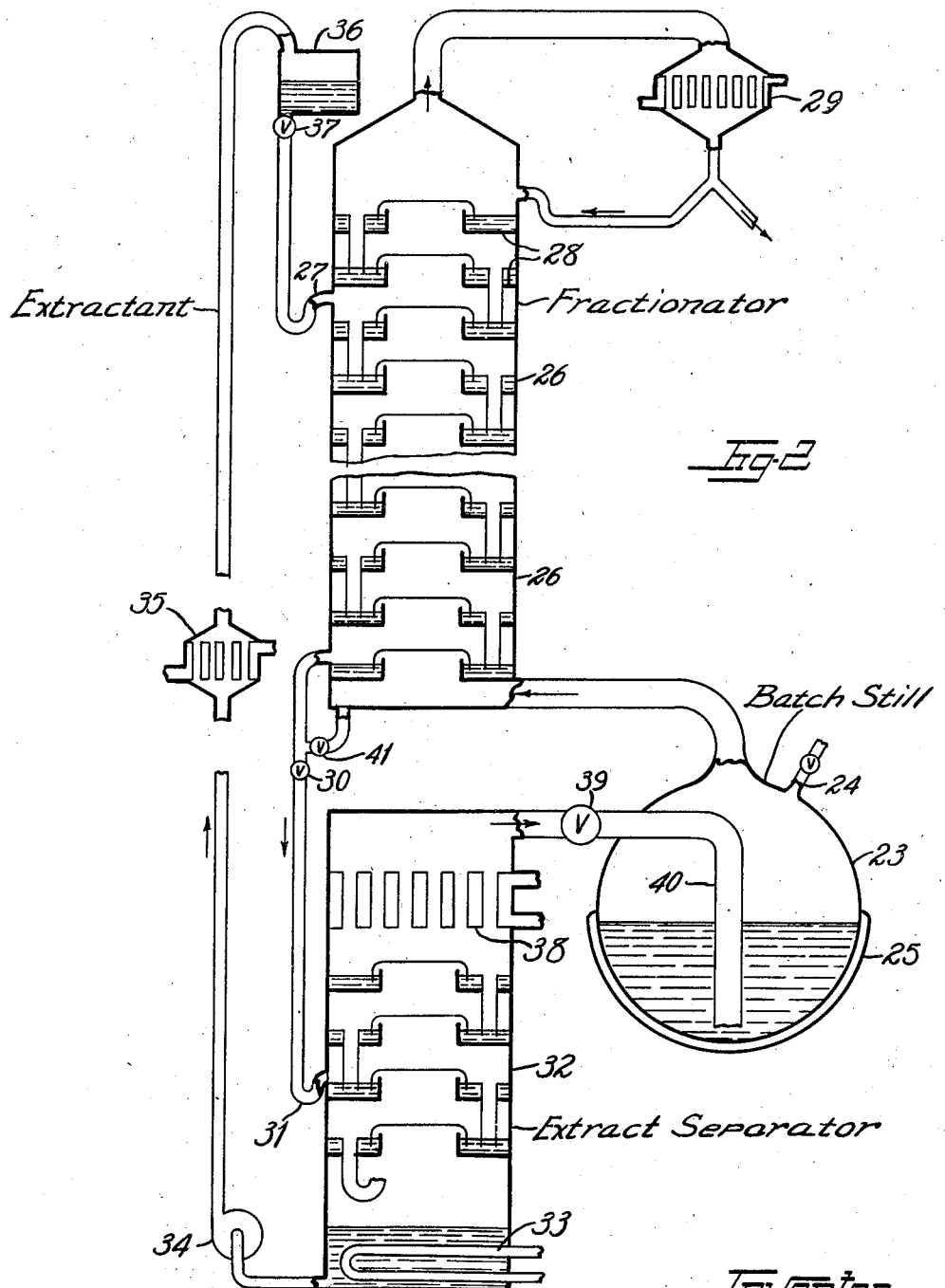

2,366,360

UNITED STATES PATENT OFFICE 2,366,360

PURIFICATION OF BUTADIENE

Waldo L. Semon, Silver Lake, Ohio, assignor to The B. F. Goodrich Company, New York, N. Y., a corporation of New York Application September 30, 1939, Serial No. 297,343

6 Claims. (Cl. 202—56)

This invention relates to the purification of butadiene, and particularly to the enrichment of crude butadiene obtained by cracking. The butadiene can readily be separated from 3-carbon hydrocarbons as well as from 5 and more carbon hydrocarbons by such means as fractional distillation, but other 4-carbon hydrocarbons such as butane and butylene boil at a temperature so close to the boiling point of butadiene as to make separation by fractional distillation impractical.

It has already been shown that a separation of butadiene from other 4-carbon hydrocarbons can be achieved by distilling the mixed hydrocarbons under proper conditions in an efficient fractionating column down which flows a selective solvent for butadiene. When such a process is put in operation a number of complicating factors make their appearance.

The volume of selective solvent required is very large—many times the volume of the materials separated—hence any process to be commercially attractive must involve the continuous recirculation of the solvent. This in turn means that the solvent must be stripped quite free of dissolved butadiene, else a considerable portion of the dissolved butadiene will be lost when the solvent is recycled and brought in contact with the effluent gases from which butadiene has been exhausted. However, the stripping of the large volumes of solvent in the case of moderately low-boiling solvents requires prolonged boiling and careful fractionation of the vapors, and even in the case of high-boiling solvents requires actual boiling for an appreciable period. Such intensive heating not only complicates the design of the equipment and increases operating expenses, but may unfavorably affect the product by initiating polymerization or inducing reactions involving the solvent.

Many of the most selective solvents have boiling points so far above that of water as to make heating to their boiling points inconvenient, while others solidify well above the normal boiling point of butadiene so that care must be taken to prevent them from plugging portions of the apparatus. Furthermore, they are in general somewhat expensive, hence even slight losses in the stripping operation (or at other points) appreciably increase the cost of the purified butadiene.

It is the object of this invention to overcome these inconveniences and provide an improved method for purifying butadiene which can be easily practiced at low overal cost without requiring use of unusually complicated or expensive apparatus. This object is accomplished by employing at least two distinct solvents in the enrichment of butadiene vapors, and preferably a highly selective solvent for butadiene having a boiling point well above that of butadiene along with a different solvent of intermediate boiling point.

This invention may be carried out either as a continuous or as an intermittent process. In the accompanying drawings Fig. 1 represents diagrammatically an apparatus suitable for a continuous process, and Fig. 2 similarly represents an intermittent apparatus.

The continuous apparatus of Fig. 1 contains a fractionating column, made up of at least twenty and preferably thirty or more bubble cap plates 10, although equivalent forms of fractionating apparatus such as packed columns may be substituted. Extractant is introduced on the uppermost plate 11 of the exhausting section of the column (the section above the feed). An additional plate or plates 12 may be operated as a scrubbing section to prevent loss of solvent, by returning a portion of the exhausted effluent (usually largely butylene) as reflux from the brine cooled condenser 13. The extract from the bottom plate 14 of the concentrating section of the column (the section below the feed) flows through conduit 15 into a stripping column. It is boiled by heating means such as steam coil 16 and the vapors are separated by plates 17. The purified vapors consisting largely of butadiene are condensed in brine cooled condenser 18. A portion of the condensate is returned as reflux to the stripping column and a portion is withdrawn as product. The remainder is vaporized, as by passage through boiler 19 heated by waste heat from stripped solvent, and returned through the conduit 20 to the bottom plate 14 of the main column to maintain the saturation of the descending solvent. The stripped solvent is recycled by pump 21 and cooler 22 to the uppermost plate 11 of the main column.

The intermittent apparatus of Fig. 2 includes a kettle 23 provided with a charging inlet 24 and heating means such as jacket 25. The vapor space is connected to the bottom of an efficient fractionating column 26 preferably containing at least thirty bubble cap plates or their equivalent. At the top of the column is a solvent inlet 27, and above this inlet one or two scrubbing plates 28 may be used to prevent loss of solvent in the distillate, by returning as reflux a portion of the distillate condensed in the brine cooled condenser 29. The saturated solvent from the bottom of the column 26 is conducted through valve 30 and a liquid seal 31 to a stripping column 32 at the base of which the liquid is boiled by heating means such as steam coil 33. The stripped solvent is recirculated through pump 34 and cooler 35 to a reservoir 36 from which it returns through valve 37 to the solvent inlet 27, while the vapors stripped therefrom, after being separated from solvent vapors by means of the stripping column 31 and dephlegmator 38, are returned to the batch in the kettle 23 through a valve 39 and conduit 40 extending below the liquid surface of the contents of the kettle. Circulation of solvent may be interrupted by closing valve 37, and the fractionating column may be isolated from the stripping column by closing valves 30 and 39. The contents of the kettle may be finished by an ordinary fractional distillation through the column 26, but to accomplish this it is necessary to provide for the return to the kettle 23 of the overflow from the bottom plate of the column 26; and this is accomplished by opening the valve 41, which joins the overflow pipe to the vapor space at the bottom of the column, so that the overflow can run back to the kettle, instead of passing to the stripping column.

The best results will usually be secured when the two solvents employed differ considerably in boiling point, the quantity of the higher boiling solvent preferably being not appreciably less than that of the lower boiling solvent, and in most cases much greater. In fact, the advantages of this invention can be secured with a quite small quantity of the lower boiling solvent in the apparatus. Of course, at least one of the solvents should be a selective solvent for butadiene—that is, when it is brought in contact with a mixture of butadiene with butylene and butane so as to dissolve a portion only of the mixture, the dissolved material should contain butadiene in greater proportion than the original mixture. Many such solvents are already known. If the solvent which is used in greater quantity is adequately selective, considerable latitude in selecting the other solvent is possible, for it need not necessarily be selective.

As a specific example of one embodiment of the invention, furfural, which boils at about 162° C., is a good selective solvent, and may be supplied at 1° C. to the top of a continuous column such as that shown in Fig. 1, the quantity of furfural being twenty times the weight of exhausted butylene being removed, while sufficient purified butadiene vapor is returned at the bottom to maintain the furfural in the column saturated. A mixture of 4-carbon hydrocarbons containing about 50% butadiene, fed at the middle of the column, can be continuously separated by this means into a butylene fraction containing not over about 5% butadiene removed at the top of the column, and a purified butadiene containing about 95% butadiene removed with the solvent at the bottom of the column. In accordance with this invention water is introduced into the stripping column. Consequently the solvent with its dissolved butadiene flowing through the downflow pipe 15 is mixed with a water-containing liquid on the plates of the stripping column, and when it reaches the heating coil 16 contains appreciable proportions of water. When this mixture boils, the boiling temperature is far below that of furfural, and the vapors contain most of the water and practically all of the residual butadiene. The composition of the liquid and vapor in the stripping column change very rapidly from plate to plate, practically all of the furfural vapor being absorbed on the lowest one or two plates, and practically all of the water being condensed on another one or two plates by contact with the refluxing liquid butadiene, while the butadiene is practically all boiled out on the plates before the liquid reaches the heating coil 16. When the column is in steady operation, it may be so adjusted that practically all of the water remains in the stripping column, serving to lower the boiling point of the furfural and sweep out the butadiene so that the recycled solvent contains only an inappreciable quantity of butadiene. At the same time, the water on the plates helps to prevent loss of furfural in the purified butadiene.

A complete elimination of water from the recycled furfural is by no means necessary, for the presence of as high as 4% water appears to have no effect on the selectivity of the furfural and its effect in separating butadiene from butylene. If water is still present in the recycled furfural, any solvent carried over with the effluent butylene consists largely of water and is therefore of no economic consequence. On the other hand, any contamination of the purified butadiene with solvent likewise consists mainly of water, and if the butadiene is to be used in an emulsion polymerization process, is plainly of no consequence.

Since the addition of the water eliminates the necessity of evaporating a part of the furfural to drive out all the butadiene, the possibility of losing furfural in the purified butadiene is minimized. While loss of water can be prevented by providing for a sharp fractionation, it will usually be more economical to allow some of it to escape and replace it by makeup water, which may be introduced at any convenient point, such as with the feed, with the butylene reflux, the butadiene reflux, by direct addition to the recycled solvent, or the like, either as liquid water or steam. For instance, a little steam can be continuously bled into the boiling furfural solution to supplement the heating action of the coil 16.

The same combination of solvents can obviously be used in an intermittently operating apparatus such as that shown in Fig. 2. Using furfural and regulating the apparatus so that furfural is supplied to the top of the column at 1° C. along with about 1% of water in a total quantity twenty times the weight of distillate removed; a crude mixture containing about 60% butadiene, the remainder being mostly butylene, is readily separated into a butylene fraction amounting to about a fifth of the charge and containing not over 5% butadiene and a residue in the kettle 23 amounting to over half the charge and containing 95% butadiene, the remainder being an intermediate fraction which can be used for starting a subsequent run. The major part of the water circulates in the stripping column 32, being boiled by the heating coil 33 and condensed by dephlegmator 38, and serving to sweep hydrocarbons out of the furfural and return them to the kettle 23.

Any other selective solvent for butadiene, such as nitrobutane, nitrobenzene, aniline, dichlordiethyl ether, ethylene chlorhydrin, dioxane, crotonaldehyde, alpha-ethyl hexenal, cyclohexanone, acetophenone, mesityl oxide, diethyl oxalate, and the like may be substituted for furfural, and may be used with any of a great number of other solvents, including, in addition to water, such solvents as methanol, ethanol, propanol, acetaldehyde, acetone, methyl ethyl ketone, ether, propyl ether, ethylene dichloride, ethyl acetate, methyl formate, methyl cyanide, diethyl sulfide, diethylamine, pyridine, benzene, cyclohexane, hexane, and the like. Almost any combinations of these solvents which do not react with one another may be used, although it is preferred to employ solvents of considerably different boiling point, as has been pointed out above. In the case of such solvents as dioxane and nitrobenzene which normally solidify above the boiling point of butadiene, the addition of small proportions of other solvents lowers the freezing point sufficiently to permit advantage being taken of their excellent selectivity without danger of solidification in the apparatus.

In the above examples the solvent has been supplied in a quantity twenty times the weight of distillate. This ratio cannot be much decreased without greatly diminishing the degree of separation of butadiene from butylene and butane. On the other hand, further increase does not appreciably change the degree of separation but only diminishes the effective capacity of the apparatus. It is apparent that there is a critical value, comparable to critical reflux ratio in ordinary fractional distillation, which must be used if best results are to be attained. If sufficient data are not available for the calculation of the critical ratio, for any particular solvent or mixture of solvents, it can easily be determined by a few simple preliminary trials. For selective solvents such as those enumerated above, at temperatures between the boiling point of butadiene and room temperature, the critical ratio will ordinarily be found to be between ten and twenty.

In some instances it may be advantageous to select the solvents with particular reference to the use which is to be made of the separated hydrocarbons. For example, if the butylene is to be hydrated to butanol, the latter may be used as the low-boiling solvent, together with a suitably selective high boiling solvent such as dibutyl phthalate; in which case carrying off of some of the butanol in the butylene fraction is of little consequence, so that the reflux of butylene to scrub solvent from this fraction can be omitted. Or if the butadiene is to be polymerized in conjunction with vinyl cyanide (or with styrene) this material may be used as the low boiling solvent; in which case carrying off of some of the solvent in the purified butadiene is of little consequence, so that careful fractionation of the vapors stripped from the solvent is unnecessary.

While the invention has been described with reference to specific examples, it is manifestly susceptible of numerous modifications. In particular, the process may be carried out at pressures other than atmospheric pressure, or at any convenient temperature, in order to secure the maximum selectivity of the particular solvents used, or for other reasons.

I claim:

1. A process for separating butadiene from a mixture of four-carbon hydrocarbons having a substantially constant boiling point, comprising distilling the mixture through an efficient fractionating column in such manner that vapors of enriched butadiene are supplied to the foot of the column to saturate the descending liquid, supplying to the head of the column at a rate in excess of the critical rate above which further increase does not appreciably change the degree of separation a liquid less volatile than butadiene consisting of a predominant proportion of a selective solvent for butadiene mixed with a material of distinctly different volatility, and recovering enriched butadiene from the solution flowing from the column by distillation of that solution.

2. The process of claim 1 in which the liquid supplied at the head of the column is a liquid consisting of a predominant proportion of a relatively non-volatile selective solvent for butadiene mixed with water.

3. The process of claim 1 in which the liquid supplied at the head of the column is a liquid consisting of a predominant proportion of furfural mixed with water.

4. The process of claim 1 in which the liquid supplied at the head of the column is a liquid consisting of a predominant proportion of acetone mixed with water.

5. The process of claim 1 in which the liquid supplied at the head of the column is a liquid consisting of a predominant proportion of a relatively non-volatile selective solvent for butadiene mixed with a solvent having a boiling point between that of the selective solvent and that of butadiene, and in which the distillation of the solution flowing from the column is carried out in such manner that vapors of the solvent of intermediate boiling point remove from the selective solvent essentially all enriched butadiene while refluxing condensate of the solvent of intermediate boiling point removes from the enriched butadiene essentially all selective solvent.

6. The process of claim 1 in which the liquid supplied at the head of the column is a liquid consisting of a predominant proportion of furfural mixed with water, and in which the distillation of the solution flowing from the column is carried out in such manner that vapors of the water remove from the furfural essentially all enriched butadiene while refluxing liquid water removes from the enriched butadiene essentially all furfural.

WALDO L. SEMON.